United States Patent [19]
Murakawa et al.

[11] Patent Number: 5,783,792
[45] Date of Patent: Jul. 21, 1998

[54] WELDING GUN ARM AND METHOD OF MANUFACTURING SAME

[75] Inventors: Toshihiro Murakawa; Mitsuo Kuwabara; Yukihiro Yaguchi, all of Saitama-ken, Japan

[73] Assignee: Honda Giken Kogyo Kabushiki Kaisha, Tokyo, Japan

[21] Appl. No.: 607,856

[22] Filed: Feb. 27, 1996

[30] Foreign Application Priority Data

| Mar. 8, 1995 | [JP] | Japan | 7-048774 |
| Mar. 22, 1995 | [JP] | Japan | 7-062736 |
| Mar. 22, 1995 | [JP] | Japan | 7-062780 |

[51] Int. Cl.$^6$ ............................ B23K 9/28
[52] U.S. Cl. ............................ 219/86.1
[58] Field of Search ............... 219/86.1, 86.21, 219/86.23, 86.24, 86.25, 86.31

[56] References Cited

U.S. PATENT DOCUMENTS

| 3,590,212 | 6/1971 | Corrigall et al. | 219/137 |
| 3,731,048 | 5/1973 | Ogden, Sr. et al. | 219/130 |
| 4,875,987 | 10/1989 | Wada et al. | 204/192.15 |
| 5,128,510 | 7/1992 | De Bruyn et al. | |
| 5,628,924 | 5/1997 | Yoshimitsu et al. | 219/121.5 |

FOREIGN PATENT DOCUMENTS

| 53-51424 | 5/1978 | Japan. |
| 57-5858 | 1/1982 | Japan. |
| 57-49077 | 3/1982 | Japan. |
| 57-52281 | 3/1982 | Japan. |
| 57-60781 | 4/1982 | Japan. |
| 57-70789 | 4/1982 | Japan. |
| 63-170087 | 11/1988 | Japan. |

*Primary Examiner*—Matthew V. Nguyen
*Attorney, Agent, or Firm*—Armstrong, Westerman, Hattori, McLeland & Naughton

[57] ABSTRACT

An arm main body of a welding gun is formed of an aluminum alloy. An anodic oxide coating is formed on an entire surface of the arm main body. The arm main body is then machined to remove the anodic oxide coating formed on a power feeing terminal portion and an electrode tip connecting portion which are provided in the arm main body. The anodic oxide coating may be subjected to a sealing treatment with a dispersion liquid in which a magnetic material is mixed in dispersion. Alternatively, the arm main body formed of an aluminum alloy may be subjected to an anodic oxide coating treatment with a treatment liquid in which a magnetic material is mixed in dispersion.

4 Claims, 3 Drawing Sheets

WELDING GUN ARM AND METHOD OF MANUFACTURING SAME

BACKGROUND OF THE INVENTION

1. Field of the Invention

The present invention relates to a welding gun arm to be used in a welding gun and a method of manufacturing the same.

2. Description of the Related Art

As a welding gun arm, there is conventionally known one in which a gun arm main body of the welding gun arm is formed of an aluminum alloy. (A welding gun is made up of a pair of welding gun arms. In this specification, however, reference is sometimes made to only one of them for the sake of simplicity.)

When a workpiece is welded by resistance spot welding, part of the workpiece which is present between electrodes and is partly melted at the time of energizing for welding, scatters in the surroundings in the form of expulsion, surface flashes, or spatters (generally called "spatters").

The spatters partly adhere to the welding gun arm. When the welding gun arm is simply made of an aluminum alloy, the spatters sometimes adhere to the outer surface of the welding gun arm by partly melting the surface of the welding gun arm by the heat of the molten spatters with the result that the spatters impinge to a certain depth into it. The spatters keep on scattering or accumulating, one on top of another, to result in an accumulated layer. It becomes therefore necessary to remove the accumulated spatters from time to time. However, since the adhered spatters are partly melted into the outer surface of the welding gun arm, it takes time to remove them. As a result, the rate of operation of the welding gun is reduced.

Upon microscopic observation of the spatters accumulated on the gun arm, it has been found, as shown in FIG. 7, that agglomerated spatters (i.e., spatters in the form of particles) b are adhered to the welding gun arm "a" with branch-shaped spatters (i.e., spatters in the form of branches of a tree) c adhered thereon, thereby forming an accumulated layer of spatters.

When scattering towards the surface of the gun arm, spatters b are relatively large in particle size and as high in temperature as about 1,200° C. Therefore, they adhere to the surface of the welding gun arm in the form of clusters or in an agglomerated manner. They partly melt the surface of the gun arm, resulting in a strong adhesive force. Spatters c, on the other hand, are considered to be formed as follows. Namely, part of the spatters of relatively small particle size which are scattered from the workpiece are rapidly cooled in the air while travelling or flying to the welding gun arm, thereby changing in shape into the form of branches of a tree and is adhered to the surface of the welding gun arm. In this manner, there are at least two kinds of spatters as described above. If their removal is neglected, they come, due to their accumulation, to contact those members of the welding gun which must be electrically insulated from the gun arm, with the result that the welding electric current comes to leak.

SUMMARY OF THE INVENTION

In view of the above disadvantages, the present invention has an object of providing a welding gun arm in which the removal of the spatters is easy and which restrains the accumulation of the spatters to the minimum extent possible, as well as a method of manufacturing the same.

In order to attain the above object, the welding gun arm of the present invention is characterized in that an anodic oxide coating is formed on a surface of an arm main body of an aluminum alloy.

The melting point of the anodic oxide coating is about 2,100° C. The temperature of the spatters, on the other hand, is about 1,200° C. at the highest. Therefore, the spatters will not be melted into the anodic oxide coating. Further, the wettability of the anodic oxide coating relative to iron, which is the main composition of the spatters, is low. As a consequence, the spatters will solidify into particles on the anodic oxide coating and can be easily peeled off the anodic oxide coating. It follows that the spatters will be separated from the anodic oxide coating even as a result of the vibrations due to the opening and closing operation of the welding gun and, therefore, that the spatters have difficulty accumulating on the welding gun arm. Further, since the anodic oxide coating has high electrical insulating characteristics, even if the spatters may be accumulated, the accumulated layer and the arm main body are electrically insulated, with the result that the leaking of electric current will not occur.

The anodic oxide coating is high in corrosion resistance. If the anodic oxide coating is formed also on internal surfaces of cooling water passages which are formed in the arm main body, the durability of the gun arm can be improved.

The base material of the arm main body must be left exposed at a power feeding terminal portion and an electrode tip connecting portion in order to feed the electric power. In this case, it is considered to subject the arm main body to an anodic oxide coating treatment after the power feeding terminal portion and the electrode tip connecting portion have been covered with a suitable material to prevent their exposure. However, if the power feeding terminal portion and the electrode tip connecting portion are subjected to machining after the anodic oxide coating treatment has been made, to thereby expose the base material at these portions by removing the anodic oxide coating thereon, the troublesome work of covering such portions with a suitable material becomes needless. It is therefore advantageous in improving the workability.

If the spatters are accumulated, there will occur various adverse effects aside from the electric current leaking. Therefore, the spatters must be removed when accumulated. It is therefore desirable to enable to further restrain or restrict the accumulation of the spatters.

As shown in FIG. 7, there are adhered on the welding gun arm even such spatters c in the form of branches of a tree as are regarded, by their nature, to be difficult of adhering thereto, and the spatters have further grown in a perpendicular direction relative to the gun arm. This phenomenon is considered to be due to the fact that the travelling or flying spatters are magnetized by the magnetic field to be generated around the gun arm by the electric current which flows therethrough, whereby the spatters adhere due to an interaction with the magnetic field. Namely, the spatters get magnetized by their flying across the magnetic field and also proceed to that region of the surface of the gun arm which is strong in magnetic field. They then adhere to the surface of the gun arm as if they were adsorbed, and accumulate in due course of time. It follows that the spatters will not be magnetized if that magnetic field around the gun arm, which is generated through the electric power supply to the gun arm, is shut off. Then, there will be no more spatters to be adhered due to their magnetization.

In case an anodic oxide coating is formed on the surface of the arm main body as described above, the anodic oxide coating is subjected to a treatment for sealing the pores of anodic oxide coating (hereinafter also called "a sealing treatment") with a dispersion liquid in which a magnetic material is mixed in dispersion, after the anodic oxide coating has been formed. Then, an anodic oxide coating containing the magnetic material on the surface of the anodic oxide coating or in a porous layer portion is obtained. According to this operation, the surface portion of the welding gun arm becomes a magnetic layer which is electrically insulated by the anodic oxide coating relative to the arm main body. As a result, when the electric current is caused to flow through the arm main body, the magnetic flux to be generated around the arm main body is concentrated on this magnetic layer. The magnetic field around the welding gun arm consequently becomes weaker and the adhesion of the spatters due to their magnetization is therefore restrained.

Further, if the arm main body is subjected to an anodic oxide coating treatment with a treatment liquid in which a magnetic material is mixed in dispersion, an anodic oxide coating containing therein the magnetic material is formed. In this case, the surface portion of the welding gun arm also becomes a magnetic layer which is electrically insulated relative to the arm main body. The adhesion of the spatters due to their magnetization can therefore be restrained in a similar manner as described above.

BRIEF DESCRIPTION OF THE DRAWINGS

The above and other objects and the attendant advantage of the present invention will become readily apparant by reference to the following detailed description when considered in conjunction with the accompanying drawings wherein.

DESCRIPTION OF PREFERRED EMBODIMENTS

Figure 1:
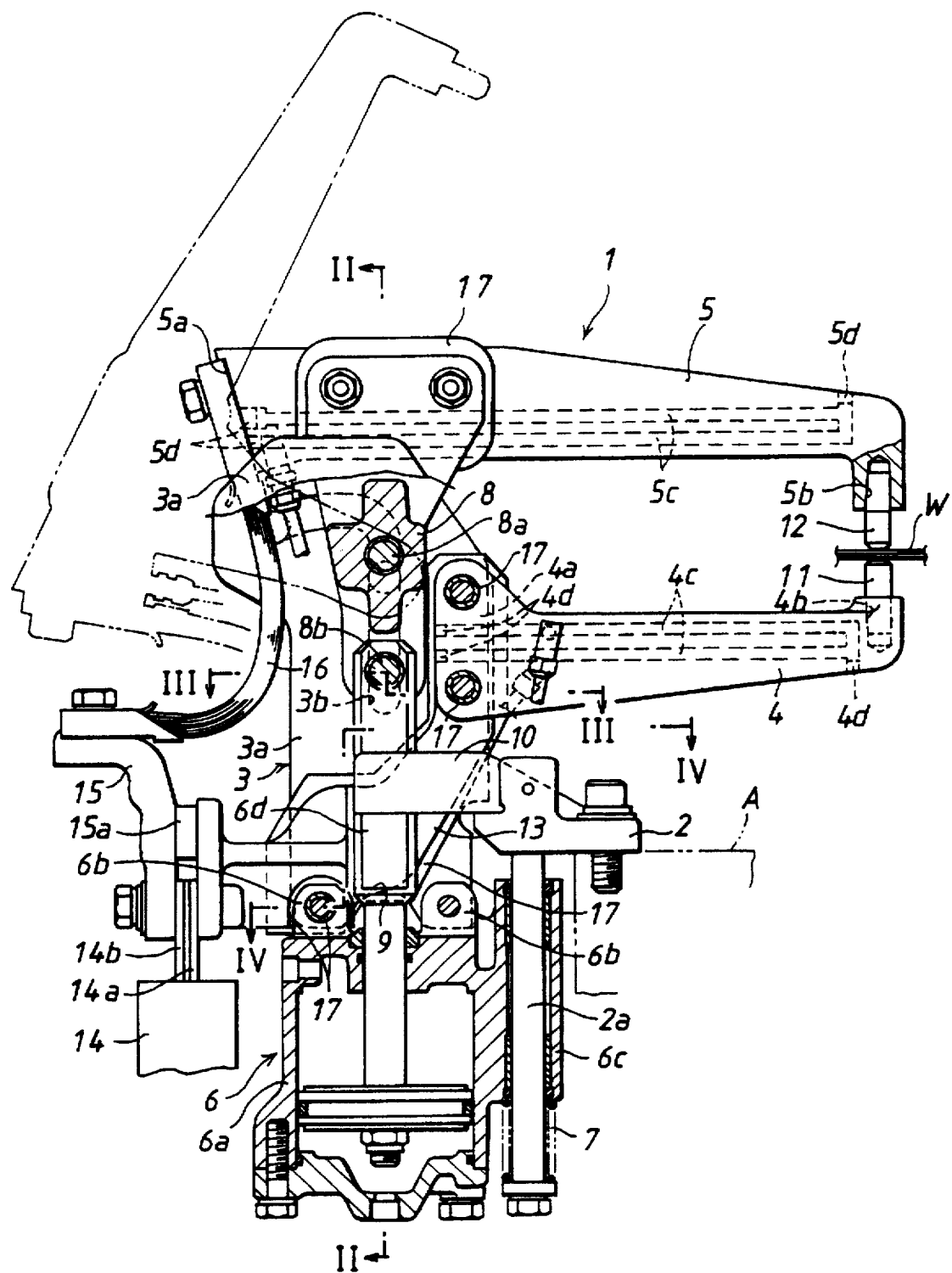
FIG. 1 is a sectional side view showing one example of a welding gun apparatus provided with a gun arm according to the present invention.

FIG. 1, reference numeral 1 denotes a stationary type of welding gun to be used by mounting it on a base A of a welding jig, or the like. This welding gun 1 is provided with a gun bracket 3 which is supported in a vertically movable manner by a mounting base 2 for mounting it on the base A, a stationary gun arm 4 which is fixed to the gun bracket 3, a movable gun arm 5 on an upper side of the stationary gun arm 4, and a pressurizing cylinder 6 which is attached to a lower end of the gun bracket 3 and which opens and closes the movable gun arm 5.

Figure 2:
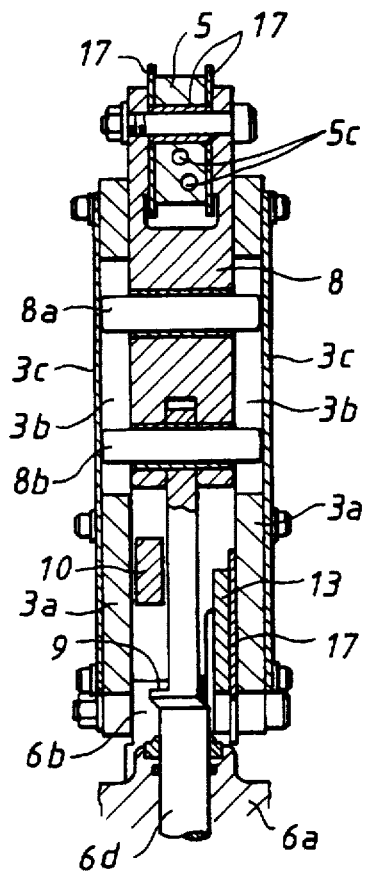
FIG. 2 is a sectional front view taken along the line II—II in FIG. 1.

The gun bracket 3 is made up, as shown in FIG. 2, of a pair of front and rear side plates 3a, 3a which are elongated in a vertical direction. A cylinder barrel 6a of the pressurizing cylinder 6 is bolted between the lower ends of the side plates 3a, 3a at a pair of projections 6b, 6b which project from an upper end of the cylinder barrel 6a. Further, on an outer side surface of the cylinder barrel 6a there is integrally formed a guide sleeve 6c. A guide bar 2a which is vertically provided on the mounting base 2 is inserted through the guide sleeve 6c. The gun bracket 3 is thus supported by the mounting base 2 via the pressurizing cylinder 6 so as to be vertically movable while being urged upwards by a spring 7.

Figure 3:
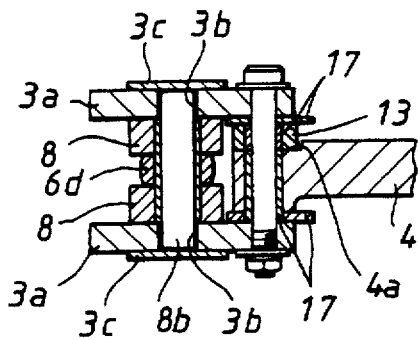
FIG. 3 is a sectional plan view taken along the line III—III in FIG. 1.

The stationary gun arm 4 is bolted, as shown in FIG. 3, at its rear end between the side plates 3a, 3a of the gun bracket 3, in a condition in which it extends in one lateral direction along the gun bracket 3.

The movable gun arm 5 is bolted to an arm holder 8 which is engaged, via a pair of upper and lower guide pins 8a, 8b, with cam grooves 3b which are formed in the side plates 3a, 3a. A piston rod 6d of the pressurizing cylinder 6 is connected to the arm holder 8. By the upward movement and the downward movement of the piston rod 6d the movable gun arm 5 is subjected to an opening movement guided by the cam groove 3b, as shown by an imaginary line in FIG. 1, and a closing movement, as shown therein by a solid line.

In the piston rod 6d there is formed an upward-looking facing stepped surface 9. A stopper arm 10 extends from the mounting base 2 into a space between the side plates 3a, 3a. When the movable gun arm 5 is opened to a predetermined open position by the upward movement of the piston rod 6d, the stepped surface 9 comes into abutment with the stopper arm 10. The gun bracket 3 is thereafter lowered against the spring 7 by the abutment reaction force, thereby opening the stationary gun arm 4 downwards.

Figure 4:
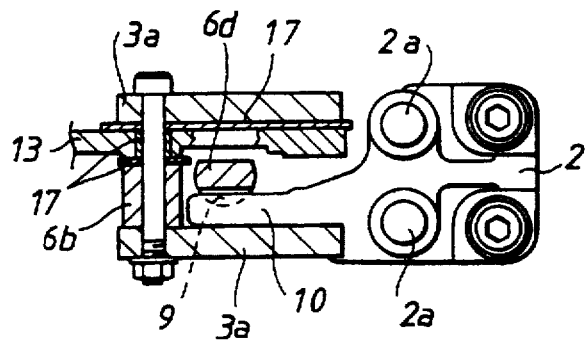
FIG. 4 is a sectional plan view taken along the line IV—IV in FIG. 1.

At a front end of each of the gun arms 4, 5 there is formed an electrode tip connecting portion 4b, 5b. An electrode tip 11, 12 is mounted on each of the electrode connecting portions 4b, 5b, respectively. By the closing movement of the movable gun arm 5, a workpiece W is held in a pinched manner between the electrode tips 11, 12 at the front ends of both the gun arms 4, 5. Both the gun arms 4, 5 are charged with electricity in this condition to thereby perform spot welding of the workpiece W. Between the side plates 3a, 3a there is provided a power feeding plate 13 one end of which extends outwards at a lower end of the gun bracket 3. The other end of the power feeding plate 13 is fastened between the side plates 3a, 3a together with the stationary gun arm 4 in a condition in which, as shown in FIG. 3, it overlaps a power feeding terminal portion 4a on one side of the rear end portion of the stationary gun arm 4. Further, as shown in FIG. 4, that portion of the power feeding plate 13 near one end thereof is fastened between the side plates 3a, 3a together with the projection 6b on the upper end of the pressurizing cylinder 6. A junction member 15 is bolted to one end of the power feeding plate 13 in a manner to pinch a pair of terminals 14a, 14b of a power feeding cable 14 which is made of a kickless cable. The junction member 15 is connected to a power feeding terminal portion 5a on a rear end of the movable gun arm 5 via an ounce metal plate 16. In this manner, one 14a of the terminals of the power feeding cable 14 is connected to the stationary gun arm 4 via the power feeding plate 13 and the other 14b of the terminals thereof is connected to the movable gun arm 5 via the junction member 15 and the ounce metal plate 16.

The following spaces are respectively electrically insulated by electrically insulating materials 17, i.e., the space between the stationary gun arm 4 and the gun bracket 3, the space between the power feeding plate 13 and the gun bracket 3, the space between the power feeding plate 13 and the pressurizing cylinder 6, and the space between the movable gun arm 5 and the arm holder 8. In the figures, reference 15a denotes an electrically insulating spacer which is interposed between one end of the power feeding plate 13 and the junction member 15, reference 3c denotes a cover which is bolted to an external surface of each of the side plates 3a of the gun bracket 3, references 4c, 5c are cooling water passages, which are formed in each of the gun arms 4, 5, and references 4d, 5d are blind plugs which are fitted into an open end of each of the cooling water passages 4c, 5c which are open to the outer surface of each of the gun arms 4, 5.

In the above-described arrangement, when spatters accumulate on each of the gun arms 4, 5, there is a possibility that the electrical insulation between the stationary gun arm 4 and the gun bracket 3 or between the movable gun arm 5 and the arm holder 8 is broken.

Figure 5:
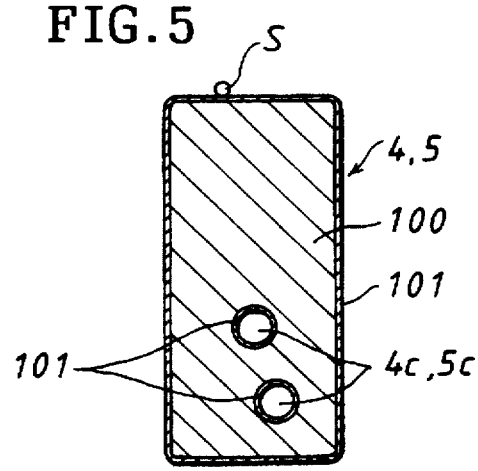
FIG. 5 is a schematic sectional view of a gun arm.

As a solution, in the present embodiment, each of the gun arms 4, 5 is made, as shown in FIG. 5, by forming an anodic oxide coating or film 101 of about 15–20 μ thick on an external surface of an arm main body 100 which is made of an aluminum alloy, for example, of A6061P-T6 (according to the classification of JIS, Japanese Industrial Standards, whose typical main composition (exclusive of aluminum) is 0.25% Cu, 0.6% Si, 1.0% Mg, 0.25% Cr; with quenching and artificial aging). Since the melting point of the anodic oxide coating 101 is as high as about 2,100° C., there is no possibility that the spatters S will get melted into it. Further, since the contact angle of the molten iron, which is the main ingredient of the spatters, relative to the anodic oxide coating 101 is about 128° and is low in wettability, the spatters S will solidify in the form of particles on the anodic oxide coating 101. Therefore, the spatters S will easily be peeled off the anodic oxide coating 101, and it becomes harder for the spatters to get accumulated on each of the gun arms 4, 5. Its removal also becomes easy. Further, since the electrically insulating characteristics of the anodic oxide coating 101 are high, even if the spatters may accumulate, there will occur no leak of electric current between the stationary gun arm 4 and the bracket 3 or between the movable gun arm 5 and the arm holder 8.

The anodic oxide coating 101 is formed by immersing the arm main body 100 into a treatment bath filled with an electrolyte which contains sulfuric acid and oxalic acid, and then subjecting it to an electrolytic treatment with the arm main body 100 working as an anode. After the electrolytic treatment, a sealing treatment is performed. Since the anodic oxide coating 101 is also superior in corrosion resistance, it is desirable to form anodic oxide coatings also on the internal surfaces of the cooling water passages 4c, 5c in order to improve the durability of the gun arms 4, 5. For that purpose, the above-described electrolytic treatment and sealing treatment are performed without fitting the blind plugs 4d, 5d in position. In this manner, anodic oxide coatings 101 are formed over the entire surface of the arm main body 100 including the internal surfaces of the cooling water passages 4c, 5c.

It is necessary to expose the base material of the arm main body 100 at the power feeding terminal portions 4a, 5a of the gun arms 4, 5 and at the electrode tip connecting portions 4b, 5b. To meet this requirement, it is considered to subject the arm main body 100 to electrolytic treatment after the power feeding terminal portions 4a, 5a and the electrode tip connecting portions 4b, 5b have been covered with a suitable seal (i.e., a material to prevent their exposure to the electrolyte). This work is however time-consuming and the workability will be improved by first forming the anodic oxide coating 101 over the entire surface of the arm main body 100 and then removing by machining the anodic oxide coating at the power feeding terminal portions 4a, 5a and the electrode tip connecting portions 4b, 5b.

The anodic oxide coating 101 may be formed, as shown in FIGS. 6A–6E, into one containing a magnetic material. The anodic oxide coating 101 has a barrier layer 101a and a porous layer portion 101b on an outer side of the barrier layer 101a. In the embodiments shown in FIGS. 6A–6D, the sealing treatment was made by using a dispersion liquid in which the magnetic material was mixed in dispersion. The surface of the anodic oxide coating 101 and the porous layer portion 101b were then provided with the magnetic material.

Figure 6A:
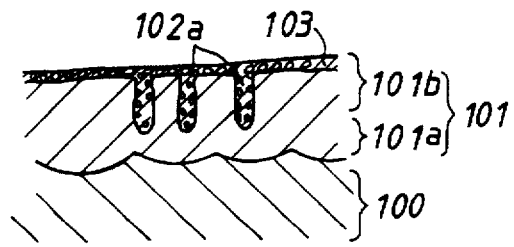
FIGS. 6A through 6E are schematic sectional views showing an anodic oxide coating portion of each example in which a magnetic material is contained in the anodic oxide coating.

In more detail, in the embodiment shown in FIG. 6A, it was so arranged that both the surface of the anodic oxide coating 101 and the porous layer portion 101b were provided with a magnetic material 102a. As the magnetic material 102a, $\gamma\text{-Fe}_2\text{O}_3$ is suitable. By using a dispersion liquid of the magnetic material, in which fine powders of $\gamma\text{-Fe}_2\text{O}_3$ are mixed in dispersion, the sealing treatment was performed by means of coating, immersing, or the like. In the illustrated embodiment, a dispersion liquid containing a resin 103 was used, but a dispersion liquid made by mixing in dispersion fine powders of $\gamma\text{-Fe}_2\text{O}_3$ into a liquid of organic paint, or the like, may also be used.

Figure 6B:
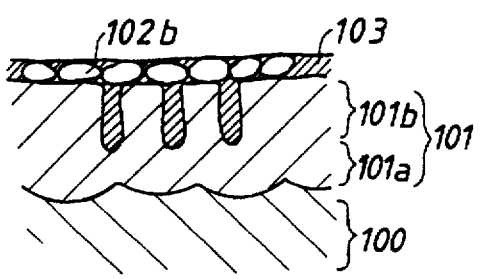

In the embodiment shown in FIG. 6B, the surface of the anodic oxide coating 101 was provided with a magnetic material 102b. As this magnetic material 102b, there can be listed one which is granulated but with relatively large particle size so that it does not, or is difficult to, enter the pores in the porous layer portion 101b, such as $Fe_3O_4$, Co, Fe, FeO, $CrO_2$, or the like. A dispersion liquid like in the above embodiment, in which $Fe_3O_4$, or the like, was mixed in dispersion, was used to perform the sealing treatment.

Figure 6C:
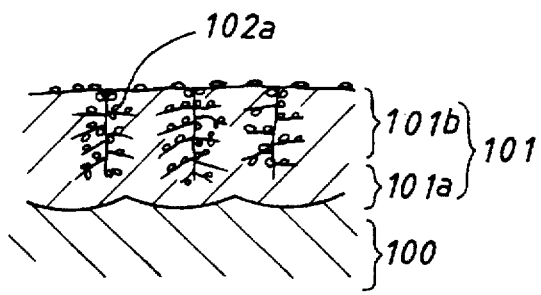

In the embodiment shown in FIG. 6C, the surface of the anodic oxide coating 101 was subjected to a hydrating sealing treatment. In the treatment, an appropriate amount, preferably 3–12% by weight, of small-particle fine powders of the magnetic material 102a, which is made up of $\gamma\text{-Fe}_2\text{O}_3$, or the like, was mixed into an aqueous solution which serves as the dispersion liquid. As a result of this treatment, the porous layer portion 101b of the anodic oxide coating 101 was sealed in a condition in which the magnetic material 102a was contained therein.

Figure 6D:
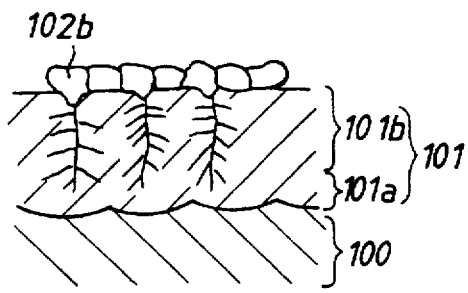

In the embodiment shown in FIG. 6D, the surface of the anodic oxide coating was subjected to a hydrating sealing treatment like in the embodiment in FIG. 6C. In the treatment, an appropriate amount, preferably 3–12% by weight, of relatively large-particle fine powders of the magnetic material 102a, which is made up of $Fe_3O_4$, Co, Fe, FeO, $CrO_2$, or the like, was mixed into an aqueous solution which serves as the dispersion liquid. As a result of this treatment, the porous layer portion 101b of the anodic oxide coating 101 was sealed. The fine powders of the magnetic material 102b, on the other hand, were expanded by hydration accompanied with the expanding by hydration of the porous layer portion 101b of the anodic oxide coating 101. The legs of the expanded fine powders found their way or entered, in the course of sealing, into the remaining pores and were, due to anchoring effects, combined with the surface of the anodic oxide coating 101. The fine powders were further combined with the surface of the anodic oxide coating 101 due to a chemical bonding (e.g., $Al_2O_3 + Fe + H_2O \rightarrow FeAl_2O_4 + H_2 \uparrow$).

In the above-described embodiments, the magnetic material 102a of a smaller particle size and the magnetic material 102*b* of a larger particle size were separately used on a case by case basis, but they may also be used in mixture in performing the sealing treatment.

Further, the kind of sealing treatment is not limited to the above-described embodiments, but an electrochemical method is also possible aside from the chemical method.

Figure 6E:
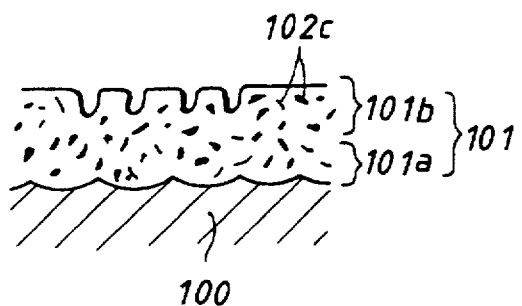
Figure 7:
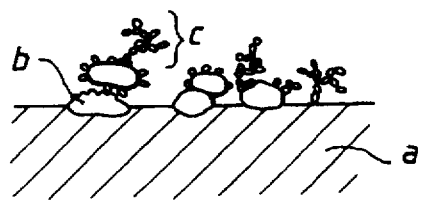
FIG. 7 is a sectional view showing a condition of accumulation of spatters on a conventional gun arm.

In the embodiment shown in FIG. 6E, an anodic oxide coating treatment was performed in a treatment liquid in which fine powders of a magnetic material were mixed in dispersion to thereby form an anodic oxide coating 101 containing therein a magnetic material 102*c* on the surface of the arm main body 100.

According to the experiment, 15% by weight of fine powders of $\gamma$-$Fe_2O_3$ as the magnetic material and 0.03% by weight of anionic surface active agent were mixed into a treatment liquid containing 15% by weight of sulfuric acid. When the anodic oxide coating treatment was performed by using this treatment liquid, $\gamma$-$Fe_2O_3$ which serves as the magnetic material 102*c* appeared as a eutectoid.

Here, $\gamma$-$Fe_2O_3$ is an acidic oxide which moves towards the cathode by electrophoresis. Therefore, an anionic surface active agent was added and the particles of $\gamma$-$Fe_2O_3$ were enclosed by the surface active agent to negatively charge them so that the particles of $\gamma$-$Fe_2O_3$ are moved towards the arm main body 100 which serves as the anode. As the anionic surface active agent, there can be listed $C_8H_{17}SO_3^-$ $Na^+$, $C_8H_{17}OSO_3^-Na^+$, $C_{10}H_{21}SO_3^-Na^+$, $C_7F_{15}COO^-Na^+$, or the like. The amount of its addition is 0.1% by weight or less, preferably 0.01–0.05% by weight.

The anionic surface active agent is deprived of the negative electric charge on the surface of the arm main body 100 and is released from the particles of $\gamma$-$Fe_2O_3$. The particles of $\gamma$-$Fe_2O_3$ thereby lose a suction force towards the arm main body 100. Therefore, it is necessary to accelerate the speed of formation of the anodic oxide coating 101 to thereby capture $\gamma$-$Fe_2O_3$ into the anodic oxide coating 101. To meet this requirement, the liquid temperature is made to be 20°–25° C. and the current density is made larger than a value (1–2 A/dm$^2$) of an ordinary anodic oxidizing treatment to accelerate the speed of coating formation. If the current density exceeds 20 A/dm$^2$, the density of the coating decreases with consequent lowered electrically insulating characteristics. Therefore, the current density is set to 20 A/dm$^2$ or less, preferably 2–5 A/dm$^2$.

The amount of mixing $\gamma$-$Fe_2O_3$ into the treatment liquid shall preferably be 5–20% by weight. In case an electrolytic solution of sulfuric acid is used as the treatment liquid, the amount of sulfuric acid shall preferably be 10–20% by weight. It is also possible to use an electrolytic solution of oxalic acid or an electrolytic solution of chromic acid as the treatment liquid. In such a case, it is preferable to limit the amount of oxalic acid to about 2–4% by weight and the amount of sulfuric acid to about 3% by weight.

In the embodiment shown in FIG. 6E there was applied no sealing treatment. However, if necessary, the porous layer portion 101*b* may be subjected to a sealing treatment by means of hydration sealing or the like.

If the anodic oxide coating 101 is provided with the magnetic material, as described in the embodiments shown in FIGS. 6A–6E, the outermost layer on each of the gun arms 4, 5 becomes a magnetic layer, and the magnetic flux to be generated by charging of the gun arms 4, 5 with electricity will be concentrated on this magnetic layer. The magnetic fields around the gun arms 4, 5 therefore become weaker by magnetic shielding relative to the gun arms 4, 5, of the spaces around the gun arms 4, 5. Consequently, the spatters that fly toward the gun arms 4, 5 become hardly magnetized and the accumulation of spatters due to the magnetic suction force can be restrained.

Also, in case the resin 103 is used as described in the embodiments shown in FIGS. 6A and 6B, the magnetic materials 102*a*, 102*b* block the spatters that fly towards the arm main body 100. Therefore, there will occur no such a disadvantage as melting of the spatters onto the surfaces of the gun arms 4, 5.

The anodic oxide coating containing therein the magnetic material may be formed over the entire surfaces of the gun arms. It may also be formed partially in such places as will cause inconveniences due to accumulation of the spatters, e.g., in places where electric leak is likely to occur as in the connecting portions and electrically insulating portions between the gun arm and the arm holder, or else in the portions at the front end of the gun arms where the electrode tips are mounted and where the accumulation of spatters becomes a hindrance to the exchanging of electrode tips.

It is readily apparent that the above-described welding gun arm and method of manufacturing the same meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A welding gun arm comprising:
    an arm main body formed of an aluminum alloy;
    an anodic oxide coating formed on a surface of said arm main body,
    wherein said anodic oxide coating includes a porous layer portion, and
    wherein at least one of a surface of said anodic oxide coating and said porous layer portion contains a magnetic material.

2. A method of manufacturing a welding gun arm comprising the steps of:
    forming an arm main body of an aluminum alloy;
    providing an anodic oxide coating on a surface of said arm main body; and
    thereafter, subjecting said anodic oxide coating to a sealing treatment with a dispersion liquid in which a magnetic material is mixed in dispersion.

3. A welding gun arm comprising:
    an arm main body formed of aluminum alloy; and
    an anodic oxide coating formed on a surface of said arm main body;
    wherein said anodic oxide coating contains therein a magnetic material.

4. A method of manufacturing a welding gun arm comprising the steps of:
    forming an arm main body of an aluminum alloy; and
    subjecting said arm main body to an anodic oxide coating treatment with a treatment liquid in which a magnetic material is mixed in dispersion.

* * * * *